(12) United States Patent
Kubicki et al.

(10) Patent No.: US 8,688,534 B2
(45) Date of Patent: Apr. 1, 2014

(54) SYSTEM AND METHOD FOR GATHERING ECOMMERCE DATA

(75) Inventors: Kristopher Kubicki, Chicago, IL (US); Lawrence Hsieh, Vancouver (CA)

(73) Assignee: Reno Acquisitions, LLC, Saratoga Springs, NY (US)

( * ) Notice: Subject to any disclaimer, the term of this patent is extended or adjusted under 35 U.S.C. 154(b) by 145 days.

(21) Appl. No.: 13/046,629

(22) Filed: Mar. 11, 2011

(65) Prior Publication Data

US 2011/0225195 A1 Sep. 15, 2011

Related U.S. Application Data

(60) Provisional application No. 61/313,636, filed on Mar. 12, 2010.

(51) Int. Cl.
*G06Q 30/00* (2012.01)

(52) U.S. Cl.
USPC ........................................ 705/26.1

(58) Field of Classification Search
USPC ................... 705/26–27, 26.1–27.2
See application file for complete search history.

(56) References Cited

U.S. PATENT DOCUMENTS

2006/0230064 A1* 10/2006 Perkowski ................. 707/104.1
2009/0112927 A1* 4/2009 Chitnis et al. ............. 707/104.1

OTHER PUBLICATIONS http://en.wikipedia.org/wiki/Regular_expression (downloaded Apr. 21, 2013; 18 pages).*

* cited by examiner

*Primary Examiner* — Jason Dunham
*Assistant Examiner* — Ethan D Civan
(74) *Attorney, Agent, or Firm* — Perkins Coie LLP

(57) ABSTRACT

The techniques introduced here provide a method of gathering ecommerce data. The techniques described here allow a system to return information about a product from several non-related ecommerce sites in response to a single search query. Using the techniques described here, a data mining system determines from the search query a product ID and retrieves from a database one or more product links that correspond to the product ID. Using the product links retrieved from the database, the data mining system traverses the links and parses the web-pages corresponding each of the links to determine up to date product information. The product information can then be returned to the application that initiated the request.

20 Claims, 6 Drawing Sheets

SYSTEM AND METHOD FOR GATHERING ECOMMERCE DATA

RELATED APPLICATIONS

This patent application claims priority to U.S. Provisional Patent Application No. 61/313,636, entitled Method and System for Finding Prime Uniform Resource Identifiers, filed Mar. 12, 2010, which is incorporated herein in its entirety.

FIELD OF THE INVENTION

At least one embodiment of the present invention pertains to web extraction, data mining, and data reporting, and more particularly, to extraction, mining, and reporting of ecommerce data.

BACKGROUND

The rapid growth in computer, the Internet, and telecommunication technology has brought about a change in how product manufacturers sell their goods. While brick and mortar establishments still provide an outlet for goods, running an ecommerce website is relatively inexpensive compared to a brick and mortar establishment and this has led to a large number of online retailers. In order to remain competitive, it can be important for online retailers to monitor competitor's prices and offerings. Manufacturers also have an interest in monitoring the pricing and availability of their products that are sold through online retailers.

Current methods of obtaining pricing comparison data include search engine provided "shopping engines" and price comparison sites, for example. Most of these sites rely on paid-placement programs, a model where merchants pay to have their information listed. The end user therefore, has no way of knowing if data from these engines is complete, timely, or accurate.

SUMMARY

The techniques introduced here illustrate a system and method for compiling, and providing access to, a comprehensive repository of ecommerce data. The system, according to one embodiment, includes an application that provides a user with an interface to access the ecommerce data and an acquisition engine that gathers real time data relating to ecommerce products the user is interested in.

In one embodiment, the data mining system receives a search query including a product URL, determines from the product URL a unique product ID associated with the product URL, retrieves from a database one or more product links that correspond to the product ID, scraping the one or more product links to get product information, and returning the product information.

In one embodiment, the data mining system includes a web server coupled with a network to receive from an application a URL associated with a product. The web server can then determine from the URL a unique product ID and return one or more product links that correspond to the unique product ID. The data mining system also includes an acquisition engine that is configured to receive the one or more product links from the web server, to scrape the one or more product links, and to return information relating to the product.

BRIEF DESCRIPTION OF THE DRAWINGS

One or more embodiments of the present invention are illustrated by way of example and not limitation in the figures of the accompanying drawings, in which like references indicate similar elements.

One or more embodiments of the present invention are illustrated by way of example and not limitation in the figures of the accompanying drawings, in which like references indicate similar elements.

DETAILED DESCRIPTION

References in this specification to "an embodiment," "one embodiment," or the like, mean that the particular feature, structure, or characteristic being described is included in at least one embodiment of the present disclosure. Occurrences of such phrases in this specification do not necessarily all refer to the same embodiment.

Those of skill in the art will appreciate that the invention may be embodied in other forms and manners not shown below. It is understood that the use of relational terms, if any, such as first, second, top and bottom, and the like are used solely for distinguishing one entity or action from another in this description, without necessarily requiring or implying any such actual relationship or order between such entities or actions.

In order to organically build databases of ecommerce, reliable indexes of all the "buy pages"—places where customers can purchase the product—are needed. As is apparent to those of ordinary skill in the art, a high percentage of ecommerce websites are built on templates, i.e., a computer system renders the information about what to buy and how to buy it. This is opposed to completely organic webpages that are hand crafted. Merchants do this so that there is low overhead in selling and listing products online. Therefore, the non-organic nature of ecommerce websites can be leveraged in order to index, i.e., keep a database of, as many buy pages as possible. However, it is extremely difficult for applications to do this in a standardized way.

Figure 1:
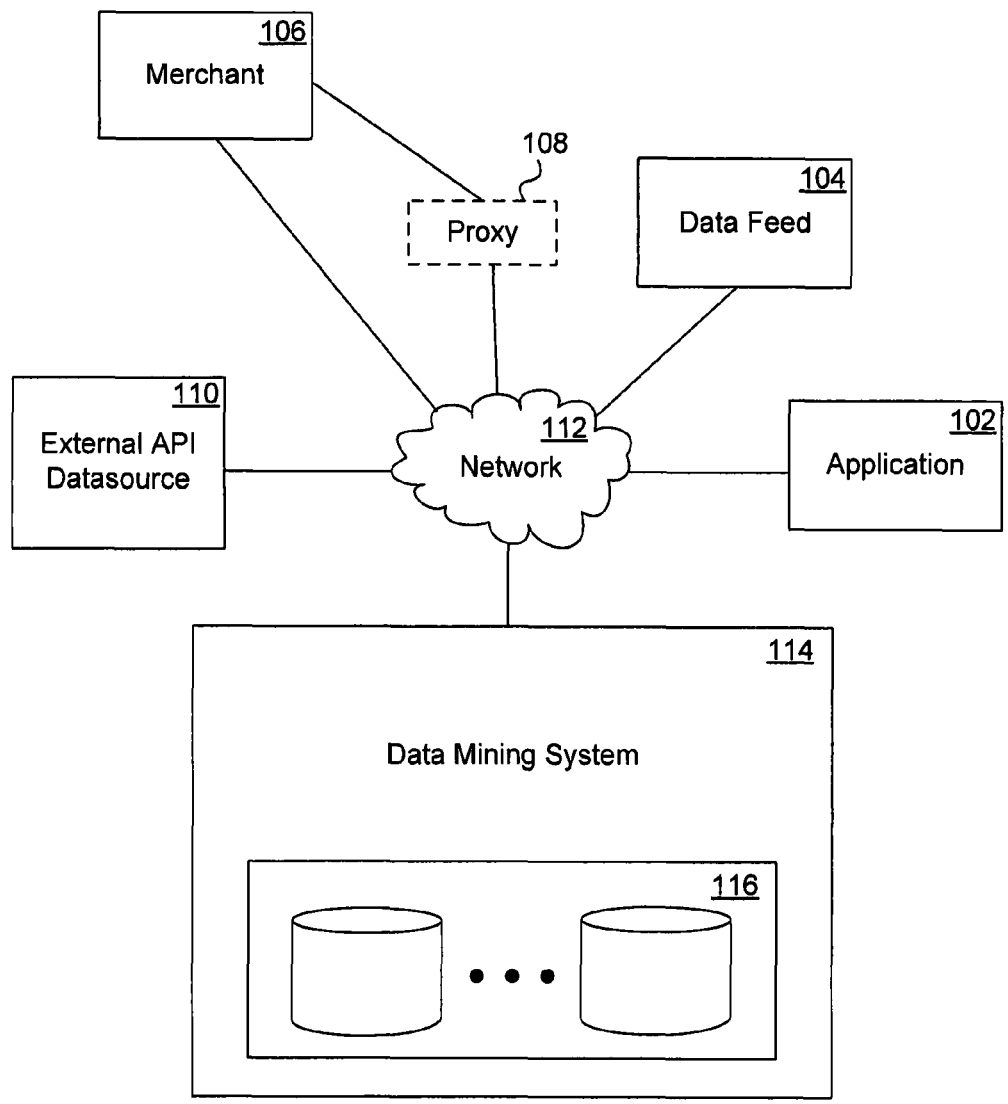
FIG. 1 shows an example of an ecommerce environment according to the techniques introduced here.

FIG. 1 shows an example of an ecommerce environment according to the techniques introduced here. The environment includes an application 102, a data feed 104, a merchant site 106, an external data source 110, a data mining system 114, and a proxy server 108 (optional), all connected through a network 112. The network can be a packet-switched network, for example, a local area network (LAN) or a wide area network (WAN). Additionally, the network 112 can be a combination of one or more networks, for example, the Internet. The data mining system 114 includes a datastore 116. Alternatively, datastore 116 can be separate from the data mining system 114 and can be accessed by the data mining system 114 through network 112 or some other interconnect.

An example of the data mining system in operation begins with an application 102 requesting data from the data mining system 114 through the network 112. In one embodiment, the request can be for price data relating to a particular product. The data mining system 114 receives the request and initiates a search to gather information relating to the request. Several sources are available from which the data mining system 114 can gather data. One source is a dedicated data feed 104, for example, a CSV (comma-separated values) feed, an RSS (Really Simple Syndication) feed, etc., that is provided by merchants, data aggregators, or other sources. The data mining system 114 can connect to a data feed 104 and download information related to the product requested by the application 102.

Another source of data for the data mining system 114 is an external data source 110. Large merchants, shopping sites, and data aggregators, often expose an application programming interface (API) that allows an outside entity to access selected information contained in the merchant's databases. For example, the data mining system 114 can include an engine which accesses a merchant database through an exposed API 110 and gathers information related to the product requested by the application 102.

Yet another source of information which the data mining system 114 can use to obtain product information for application 102 is the buy page of a merchant site 106 that displays a particular product. The data mining system 114 can connect to the merchant site 106 through the network 112. The data mining system 114 can then parse the information contained on the merchant's product page to gather information relevant to the application's request. In one embodiment, the data mining system 114 connects to the merchant site 106 through a proxy server 108.

Figure 2:
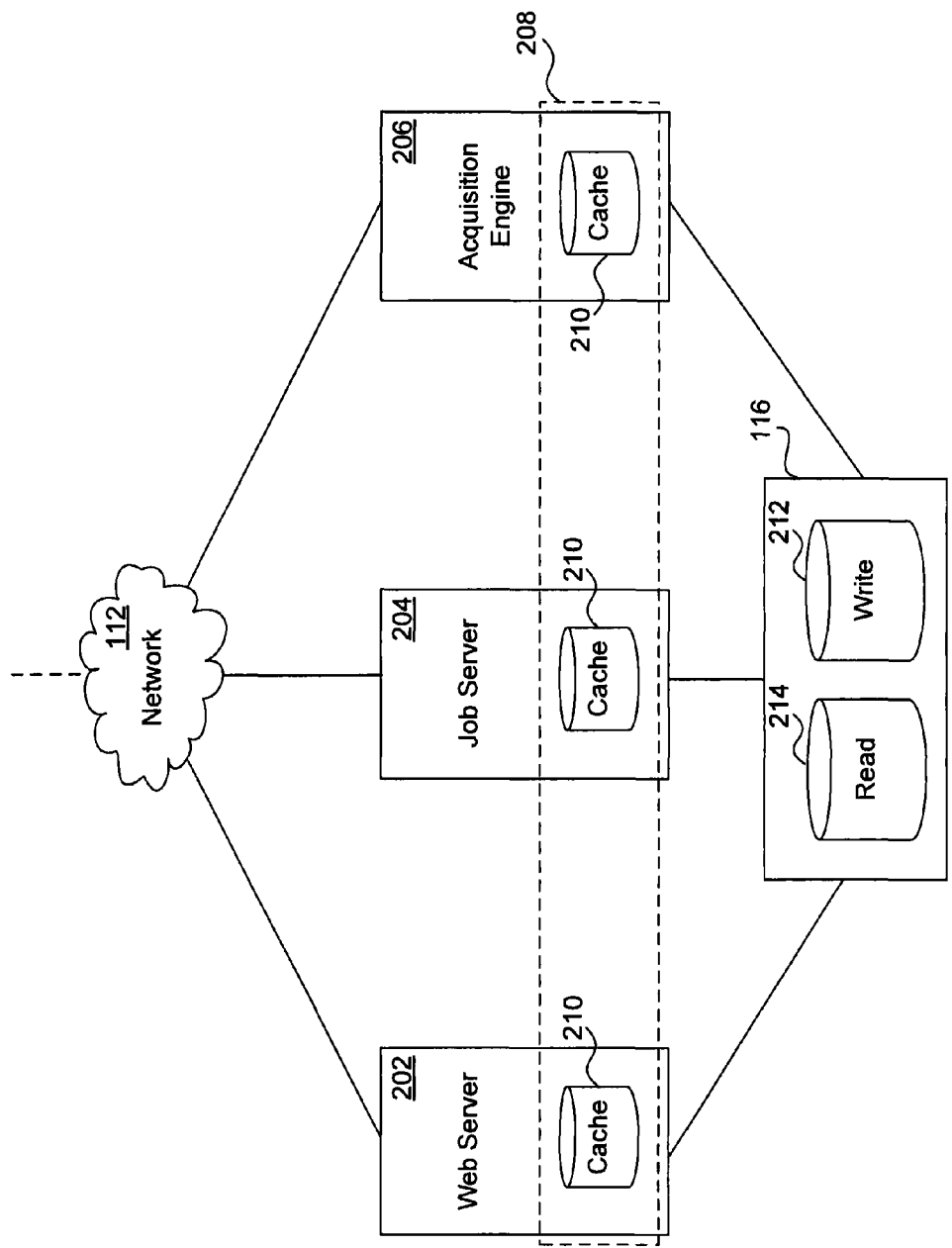
FIG. 2 shows an example of a data mining system according to the techniques introduced here.

FIG. 2 shows an example of a data mining system 114 according to the techniques introduced here. The data mining system 114 is connected to network 112 as depicted in FIG. 1. The data mining system includes a web server 202, a job server 204, an acquisition engine 206, shared memory 208, and datastore 116. The elements of the data mining system 114 are shown connected through network 112, however, it should be apparent that the elements can be connected through other interconnects as well. Further, while only a single web server 202, job server 204, acquisition engine 206, and datastore 116 are shown in FIG. 2, it should be understood that there can be multiples of each element operating in the data mining system 114 concurrently.

An application 102 connects to the data mining system 114 through the web server 202 to request information. In one embodiment, the web server 202 provides access to a web-based dashboard that acts as an interface between an end user and the data mining system. In another embodiment, the web server 202 exposes an API which external entities can utilize to access the data mining system 114 or data maintained by the data mining system. Regardless of how the data mining system is accessed, when a request for information is received a job request is forwarded from the web server 202 to the job server 204.

Job server 204 maintains a queue of job requests received from web server 202. Acquisition engine 206 monitors the job queue maintained by job server 204. In one embodiment, acquisition engine 206 is a self-replicating engine which maintains a suitable number of instantiations to process the job requests within the job queue. In one embodiment acquisition engine 206 stores results from performing a job in the datastore 116. In another embodiment, the results are also stored in a local copy 210 of shared memory 208. The data in the local copy can then be replicated to other local copies in the shared memory so the data is available to all elements of the data mining system.

Datastore 116 includes a write cache 212 and a read cache 214. Because there can be multiple acquisition engines working concurrently, there is potentially a high volume of writes to a database included in datastore 116 that can happen concurrently. This may cause a bottleneck and slow down the data acquisition process. In order to prevent this bottleneck, write cache 212 stores the data as the data is returned by the acquisition engines and then the data is written to the database from the cache 212. The read cache 214 works in a similar manner except that the data is stored in a cache so there is not a bottleneck created by a large number of reads to the database.

Figure 3:
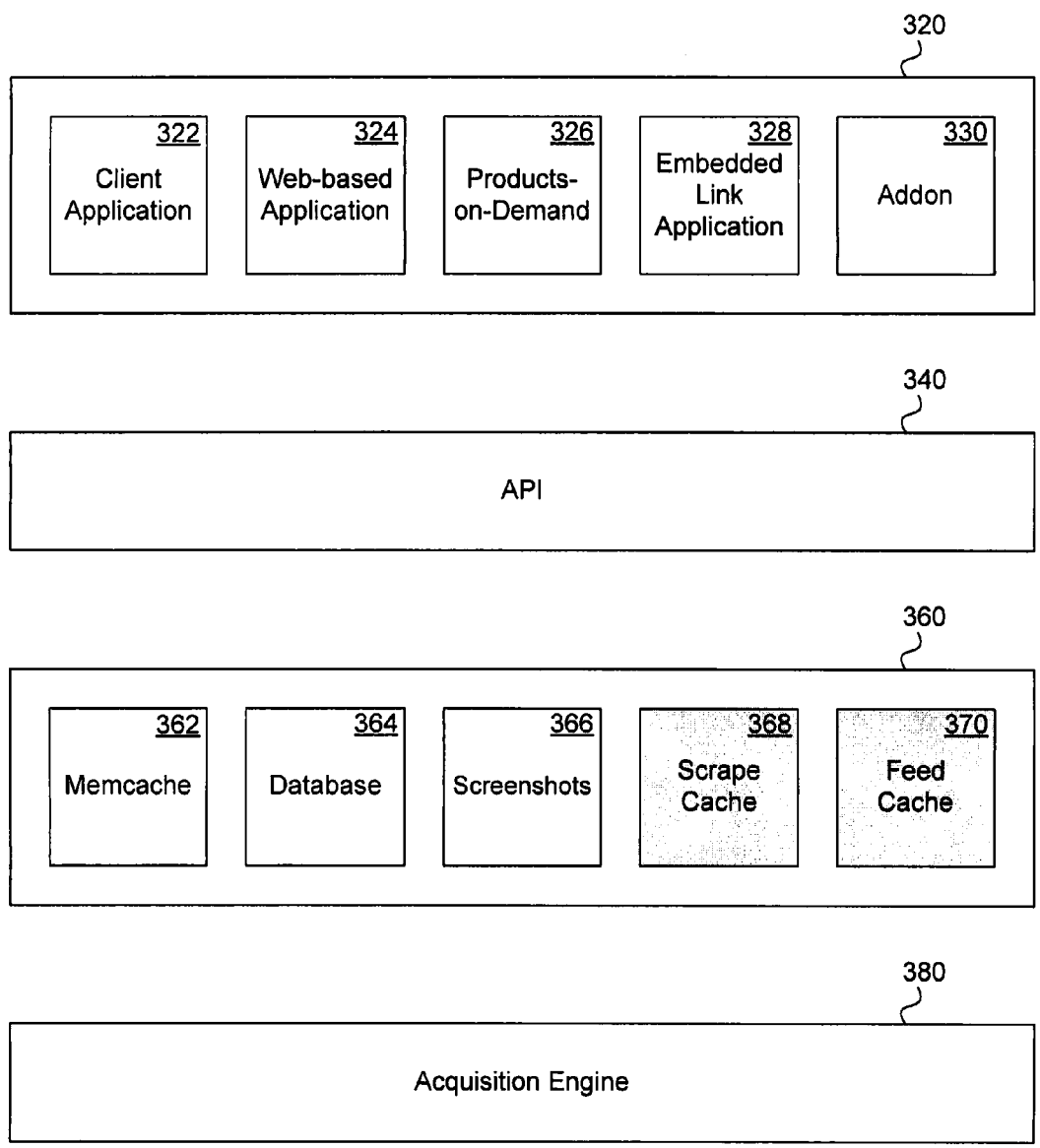
FIG. 3 is a hierarchical view of the system described in FIGS. 1 and 2.

FIG. 3 is a hierarchical view of the system described in FIGS. 1 and 2. The system includes applications 320, API 340, datastore 360, and acquisition engine 380. The applications depicted within 320 are examples of multiple applications that can access the data mining system. For example, the applications 320 include a client application 322, a web-based application 324, a products-on-demand (POD) application 326, an embedded link application 328, and a web-browser addon application 330.

The applications 320 provide an interface for an end user to access the information provided by the data mining system. For example, in one embodiment, the client application 322 can be any application provided by an entity outside of the data mining system that accesses the data mining system through an expose API. This application 322 could be, for example, an in-house product reporting program that uses real time price information gathered by the data mining system. Other applications that can use the data mining system's exposed API should be apparent to one of ordinary skill in the art.

In another embodiment, users can access the information obtained by the data mining system through a web-based application 324. The web-based interface to the data mining system can be provided for users to access the data mining system information without the need to create a specialized application. The web-based application 324 includes, for example, a request component where a user can request information relating to a particular product or service. The web-based application 324 also includes a reporting component to display the gathered information to the user.

A POD application 326, in one embodiment, is a piece of code, for example Javascript, which is embedded by a webmaster in a webpage. The POD application 326 provides links to merchant buy pages related to products displayed on the webpage. For example, a computer component manufacturer can include a POD script in the webpage describing a newly released product. When a user visits the site to learn more about the component, they will be presented with a list of merchants selling the product. In one embodiment, the webmaster can select the merchants for which buy pages will be displayed.

An embedded link application 328, in one embodiment, is also a piece of code running on a web server. The embedded link application 328 connects to the data mining system and caches a list of reseller domains, which the data mining system can gather data for, on the web server. When content on the web server links to a domain in cached list of resellers, the embedded link application 328 replaces the URL with a redirector URL that includes a user ID, which identifies the user that installed the application. When a visitor to the website clicks on the link, the embedded link application 328 receives from the data mining system a redirected location where the user who installed the application can get paid for the click.

Addon application 330, in one embodiment, is a web browser addon that can be installed by consumers who shop online. The addon 330 passes an identifier of the product that the consumer is viewing to the data mining system. The data mining system can then return a list of other retailers and the price that they are selling the product for.

The applications 320 access information stored in the datastore 360 through an API 340 exposed by the data mining system. Although the API 340 is shown as a single API, it should be apparent to one of ordinary skill in the art that the API 340 can be a collection of various APIs that provide access to the data mining system. In one embodiment, the datastore includes memcache 362, a database 364, a screenshot repository 366, a scrape cache 368, and a feed cache 370. Because there can be multiple jobs processing at a given time, and some of those jobs may produce duplicate information, the datastore 360 provides a location for data obtained by each of the multiple instances of the acquisition engine 206 to be gathered, integrated, and stored.

Memcache 362 is a shared caching system which speeds up access to a database 364 by caching previously used data and objects in order to reduce the number of times the database 364 must perform a read operation. In one embodiment, along with acquiring pricing information from a website, the acquisition engine takes a screenshot of the website at the time it was visited and stores the screenshot in a repository 366. The datastore 360 is populated by acquisition engine 380 as described below.

Figure 4:
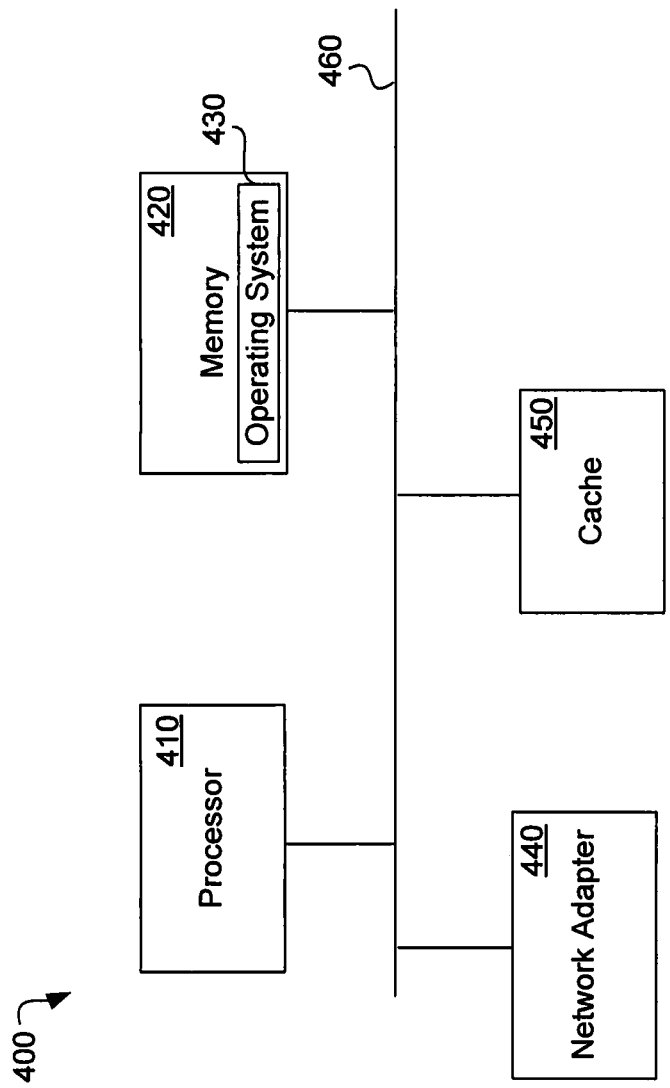
FIG. 4 is a diagram illustrating an example of a system that can implement one or more elements of the data mining system.

FIG. 4 is a diagram illustrating an example of a system 400 that can implement one or more elements of the data mining system 114. For example, the system 400 can implement the web server 202, the job server 204, or the acquisition engine 206. In an illustrative embodiment, the system 400 includes a processor subsystem 410 that includes one or more processors. The system 400 further includes a memory 420, a network adapter 440, and a local cache 450, all interconnected by an interconnect 460.

The memory 420 illustratively comprises storage locations that are addressable by the processor(s) 410, network adapter 440, and local cache 450 for storing software program code and data associated with the techniques introduced here. The processor 410 and adapters may also comprise processing elements and/or logic circuitry configured to execute the software code and manipulate the data structures. It will be apparent to those skilled in the art that other processing and memory implementations, including various computer readable storage media, may be used for storing and executing program instructions pertaining to the techniques introduced here.

The network adapter 440 includes at least one port to couple the system 400 with other systems over a variety of networks, for example, point-to-point links, wide area networks, virtual private networks implemented over a public network (Internet) or a shared local area network. The network adapter 440 thus can include the mechanical, electrical and signaling circuitry needed to connect the system 400 to the network 112. Illustratively, the network 112 can be embodied as an Ethernet network or a Fibre Channel (FC) network. Each external system, e.g., merchant site 106, can communicate with the system 400 over the network 112 by exchanging discrete frames or packets of data according to pre-defined protocols, such as TCP/IP.

The local cache 450 can store data locally and cooperates with the operating system 430 to access information requested by applications 102. The information may be stored on any type of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information.

Figure 5:
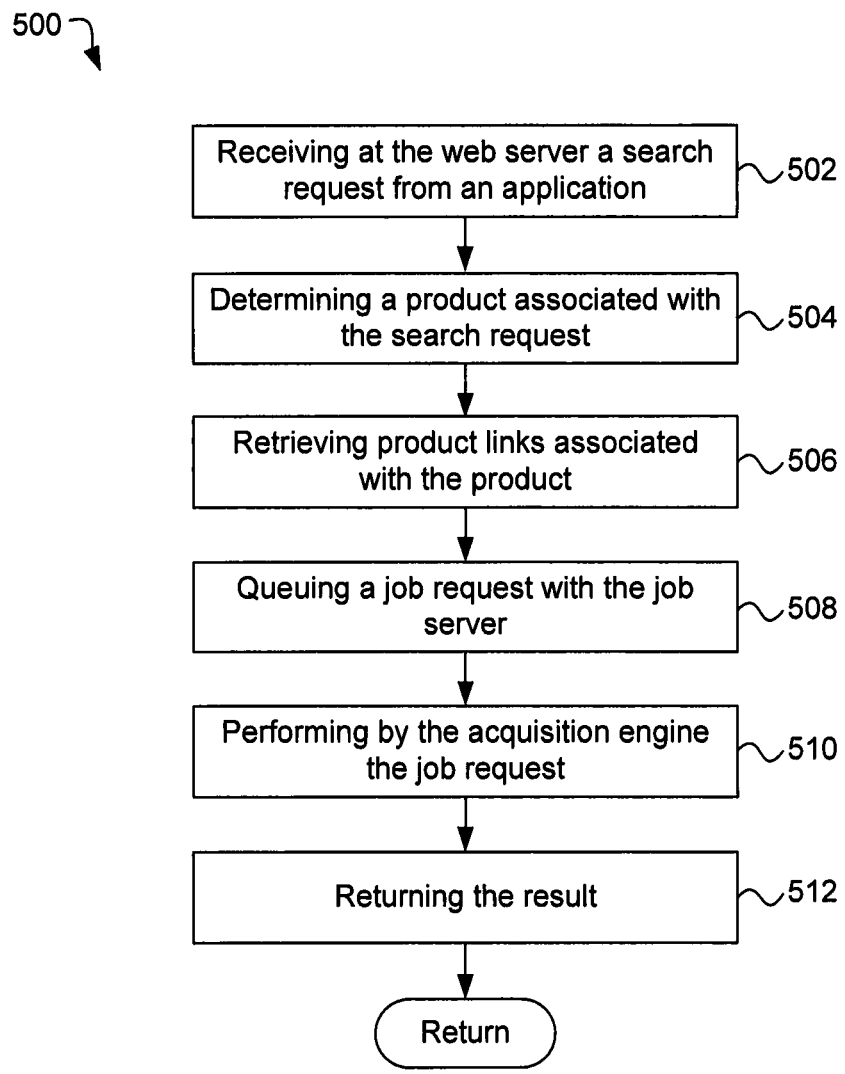
FIG. 5 is a high level flow diagram of a process for acquiring data using the techniques introduced here.

FIG. 5 is a high level flow diagram of a process 500 for acquiring data using the techniques introduced here. The process 500 is depicted as a flow chart of ordered steps. However, it should be understood that at least some of the operations associated with these processes can potentially be reordered, supplemented, or substituted for while still performing the same overall technique.

At 502, a web server, for example web server 206 of data mining system 114, receives a search request from an application. For example, a user that is logged in to a web-based dashboard of the data mining system can enter a search request for up to date pricing of a product from multiple ecommerce retailers. In another example, a computer program designed to track products in ecommerce can initiate a search on a specific product. The search query can include, for example, a URL that points to the product on an ecommerce site, a product stock keeping unit (SKU), or a product/manufacturer name.

In one embodiment, at 504, the web server determines a product associated with the search query. The data mining system can maintain a database of products where each product is associated with a product ID. The product database can be part of a relational database, such as an SQL database. The database can include information such as the SKU, product and manufacturer names, part number, a physical description, and other identifying information. Upon receiving the search query, the web server can query the database and return the product ID associated with the product. The database query for definite fields, for example, a product SKU or name, can be a routine database query. However, a query based on a URL is more difficult without maintaining a prohibitively large database of all possible URLs that point to a product. An example process for linking a URL with a product ID according to the techniques introduced here is described in more detail with respect to FIG. 6.

The database can include a table of product links that are related to the product. The product ID can be used as a key to the table of product links. The table of product links can include a link to each of a number of retailers that are set up to sell the product. At 506, the web server can query the table of product links based on the product ID and return a list of links that point to retailer buy pages. The web server can then create a job request to gather up to date information from each of the links in the list.

At 508, the web server forwards the job request to a job server where the job server holds the job in a queue for processing. At 510, an acquisition engine, for example, acquisition engine 206, that is available to perform the job takes the job from the queue. In one embodiment, if there is not an acquisition engine available to perform the job, a new acquisition engine is instantiated and the new acquisition engine performs the job. The acquisition engine traverses each of the links in the job request and parses the site to obtain up to date information relating to the product being searched.

At 512 the results of the search are returned to the application that requested the job. The application, for example the web-based dashboard, can then display the information to the user. In addition to returning the data collected by the acquisition engine to the user, the data is indexed and stored in the datastore for future reference. In one embodiment, if the application session times out prior to results being returned, the results are stored in the datastore for future reference.

While the foregoing process is described as being performed by individual server machines, it should be apparent to one skilled in the art that a single server machine, or any number of machines, can carry out the various functions of the servers described above.

Figure 6:
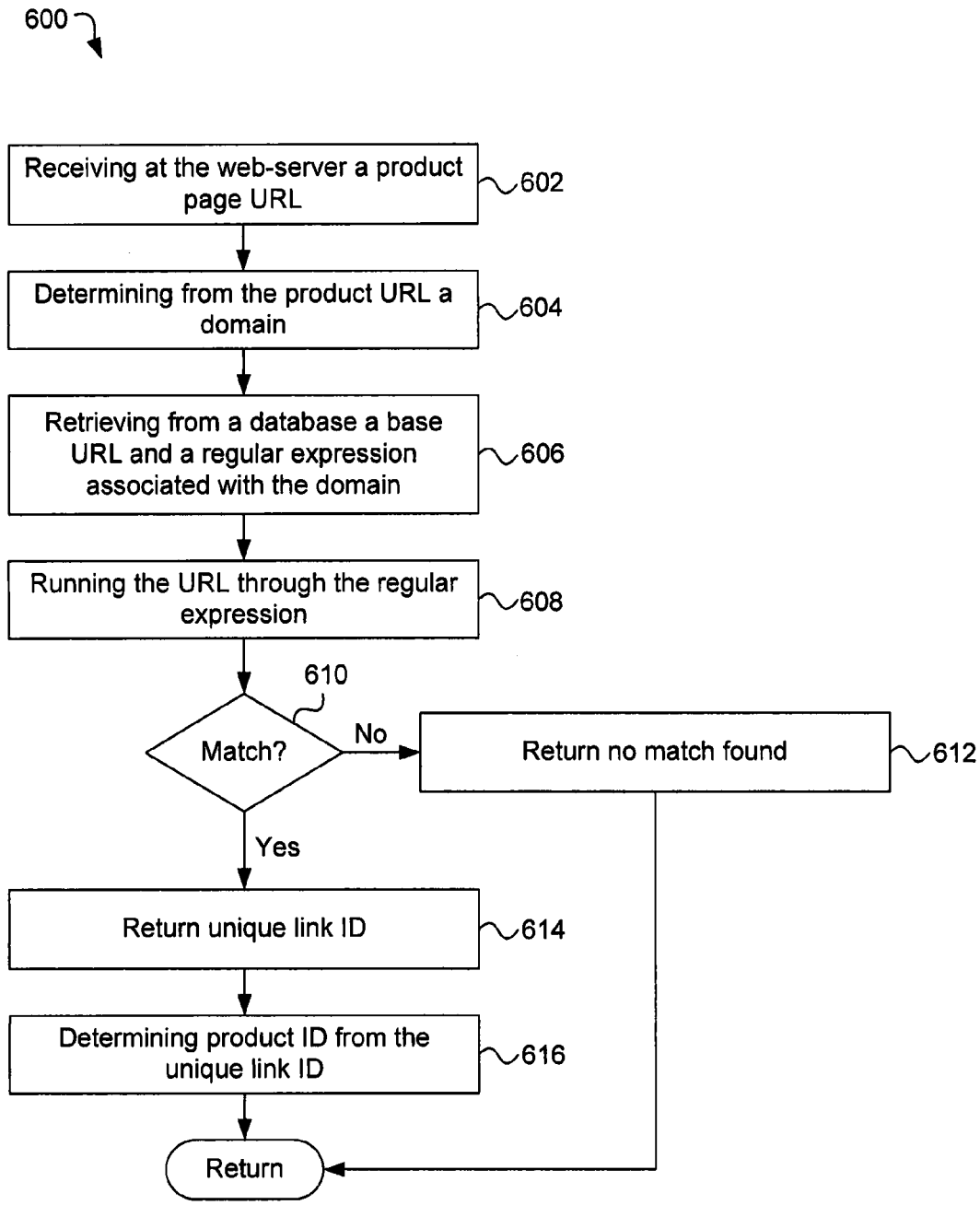
FIG. 6 is a flow diagram of a process for determining a product ID from a product URL.

FIG. 6 is a flow diagram of a process 600 for determining a product ID from a product URL. The process 600 is depicted as a flow chart of ordered steps. However, it should be understood that at least some of the operations associated with these processes can potentially be reordered, supplemented, or substituted for while still performing the same overall technique.

The process begins, at 602, with a web server receiving a search query that includes a URL of a product page on an ecommerce site. As described above, determining from a URL what product is being listed on a website is not a trivial problem. For example, there can be multiple variations of a URL that all point to a single product page. The variations in the URLs can be due to search engine optimization, referral tags, redirectors, etc. Building a database of all the possible variations of a product page URL is impractical, if not impossible. Thus, a simple lookup table including all possible URLs is not a viable solution.

The process continues, at 604, with the web server determining from the URL a domain. For example, given the product URL, which has been formatted for this document but can be resolved by one of ordinary skill in the art:

```
amazon.com/gp/product/B001ENOZY4/ref=s9_simh_gw_p23_t2?pf_
rd_m=ATVPDKIKX0DER&pf_rd_s=center-
2&pf_rd_r=1E6KH6A49ZMVR9KGYEZS&pf_rd_t=101&pf_rd_p=470
938631&pf_rd_i=507846
``` the domain is amazon.com. The domain can be determined by various methods known in the art.

At 606 the process continues with the web server retrieving from a database a base URL and a regular expression associated with the domain. The base URL and the regular expression can be used, along with the domain, to build a unique prime URL from the given URL. A prime URL can be defined as a URL that cannot be expressed in any simpler form and still lead to the same site. A method for building a database including the base URL and regular expression can be found in U.S. patent application Ser. No. 12/980,669, filed Dec. 29, 2010, which is incorporated herein by reference.

The process continues at 608 with the web server running the URL through the regular expression. In one embodiment, the web server includes a regular expression processor that examines the text of the URL and returns a result that can be combined with the base URL and domain to create a prime URL. In one embodiment, the Base URI may encapsulate the domain, or the web server may accept permutations of the domain. This can be important for websites that may rely on different URL schemes (https://vshttp://). Each prime URL is a unique link, a link to a specific product page provided by a specific retailer.

At 610 the process continues with the web server querying a database for the prime URL. In one embodiment, each prime URL in the database is associated with a unique link ID. If the query does not return a match, 610—No, the process continues at 612 where a response of no match is returned and the process returns to wait for the next query. If the query does return a match, 610—Yes, then the process continues at 614 where the unique link ID for the URL is returned to the web server.

At 616, the web server can query the database to return a product ID that is associated with the product being sold at the unique link. The unique link ID can be used as a key to the product database. The product ID can then be used to determine other unique links where the product is being sold as described above with reference to FIG. 5.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    receiving at a data mining system, a product URL;
    determining, using a hardware processor of the data mining system, whether the product URL has a pattern of alpha-numeric characters, numbers or symbols that is defined by a regular expression, wherein the regular expression defines a rule that represents URLs as a sequence of alphanumeric characters, numbers or symbols;
    if the product URL has the pattern defined by the regular expression, generating a unique link ID associated with the product URL by extracting the alphanumeric characters, numbers or symbols from the product URL based on the regular expression;
    retrieving from a database a product ID corresponding to the unique link ID;
    retrieving from the database one or more product links that correspond to the product ID;
    traversing the one or more product links;
    parsing, by the processor, a web-page corresponding to each of the one or more product links to determine product information; and
    displaying the product information, via a display device, to a user.

2. The method of claim 1 wherein determining a unique link ID includes:

determining from the product URL a domain and retrieving the regular expression that corresponds to the domain from the database;

processing the product URL using the regular expression;

combining the domain with the processed product URL to create a unique link; and retrieving a unique link ID associated with the unique link from the database.

3. The method of claim 1 further comprising writing the returned product information to the database, wherein the product link is used as a key for the product information.

4. The method of claim 1 further comprising writing the returned product information to a local instance of a shared cache and replicating the product information to other instances of the shared cache.

5. The method of claim 1 wherein the product information includes a screenshot of a web-page referenced by the product link.

6. The method of claim 1 wherein the product information includes at least one of, a SKU, a product name, a manufacturer name, a part number, a physical description, or a sales price.

7. A data mining system comprising:

a web server coupled with an application through a network, the web server configured to receive from the application a URL associated with a product, wherein, in operation, the web server determines whether the URL has a pattern of alphanumeric characters, numbers or symbols that is defined by a regular expression, wherein the regular expression defines a rule that represents URLs as a sequence of alphanumeric characters, numbers or symbols, if the product URL has the pattern defined by the regular expression, generates a unique product ID from the URL by extracting the alphanumeric characters, numbers or symbols from the URL based on the regular expression, retrieves from a database one or more product links that are associated with the unique product ID, and creates a job request to gather information from the one or more product links;

an acquisition engine configured to traverse the one or more product links in response to the job request, wherein the acquisition engine, in operation, parses a web-page corresponding to each of the one or more product links and returns information relating to the product from the one or more product links.

8. The data mining system of claim 7 further comprising a job server configured to queue the job request until the acquisition engine is available to process the job request.

9. The data mining system of claim 7 further comprising a datastore including a product information database, wherein the information relating to the product is written to the product information database.

10. The data mining system of claim 7 further comprising a shared cache, wherein the information relating the product is written to the shared cache.

11. The data mining system of claim 7 further comprising an application programming interface (API) configured to provide an interface with the application to access the information gathered by the data mining system.

12. A method comprising:

receiving at a data mining system, through an application programming interface, a search query including a product URL;

determining, at the data mining system, whether the product URL has a pattern of alphanumeric characters, numbers or symbols that is defined by a regular expression, wherein the regular expression defines a rule that represents URLs as a sequence of alphanumeric characters, numbers or symbols;

if the product URL has the pattern defined by the regular expression, producing using a hardware processor of the data mining system, a unique link by extracting the alphanumeric characters, numbers or symbols from the product URL based on the regular expression;

retrieving from a database a unique link ID that corresponds to the unique link;

retrieving from the database a product ID corresponding to the unique link ID;

retrieving from the database one or more product links that correspond to the product ID;

traversing the one or more product links;

parsing, by the processor, a web-page corresponding to each of the one or more product links to determine product information; and displaying the product information, via a display device, to a user.

13. The method of claim 12 wherein producing a unique link by running the product URL through a regular expression includes:

determining from the product URL a domain and retrieving the regular expression that corresponds to the domain from the database;

processing the product URL using the regular expression; and combining the domain with the processed product URL to create a unique link.

14. The method of claim 12 further comprising writing the returned product information to a product database.

15. The method of claim 12 further comprising writing the returned product information to a local instance of a shared cache and replicating the product information to other instances of the shared cache.

16. The method of claim 12 further comprising taking a screenshot of a web-page referenced by each product link of the one or more product links and returning the screenshot with the product information.

17. The method of claim 12 wherein the product information includes at least one of, a SKU, a product name, a manufacturer name, a part number, a physical description, or a sales price.

18. A computer server, comprising:

a processor;

a network interface, coupled to the processor, through which the computer server can communicate with ecommerce sites;

a data storage storing a database; and a memory storing instructions which, when executed by the processor, cause the computer server to perform a process including:

receiving, via the network interface, a product URL of a product web page from an ecommerce site;

determining whether the product URL has a pattern of alphanumeric characters, numbers or symbols that is defined by a regular expression, wherein the regular expression defines a rule that represents URLs as a sequence of alphanumeric characters, numbers or symbols;

if the product URL has the pattern defined by the regular expression, reducing to a prime URL from the product URL by extracting the alphanumeric characters, numbers or symbols from the product URL using the regular expression, wherein the product URL is not in the simplest form, wherein the prime URL is a URL that cannot be expressed in any simpler form and still leads to the product web page; and retrieving, form the database, a product ID associated with the prime URL, wherein the product ID identifies a product being sold in the product web page.

19. The computer server of claim 18, wherein the creating a prime URL by running the product URL through a regular expression further includes:

determining, by the processor, a domain of the ecommerce site from the product URL of the product web page;

retrieving, from the database, a base URL and a regular expression associated with the domain; and creating a prime URL by running the product URL through a regular expression and adding the base URL.

20. The computer server of claim 18, wherein the process further includes:

associating the product ID to a plurality of product URLs, wherein the plurality of product URLs have the same prime URL.

* * * * *